US010934501B2

(12) United States Patent
Boam et al.

(10) Patent No.: US 10,934,501 B2
(45) Date of Patent: *Mar. 2, 2021

(54) MEMBRANE-BASED PROCESSES FOR SELECTIVELY FRACTIONATING ESSENTIAL OILS

(71) Applicant: EVONIK OPERATIONS GMBH, Essen (DE)

(72) Inventors: Andrew Boam, Hitchin (GB); Andrea Meniconi, Siena (IT); Xiaoping Wu, Abingdon (GB)

(73) Assignee: EVONIK OPERATIONS GMBH, Essen (DE)

( * ) Notice: Subject to any disclaimer, the term of this patent is extended or adjusted under 35 U.S.C. 154(b) by 142 days.

This patent is subject to a terminal disclaimer.

(21) Appl. No.: 16/209,009

(22) Filed: Dec. 4, 2018

(65) Prior Publication Data

US 2019/0106654 A1 Apr. 11, 2019

Related U.S. Application Data

(63) Continuation of application No. 14/399,273, filed as application No. PCT/EP2013/055833 on Mar. 20, 2013, now Pat. No. 10,202,562.

(30) Foreign Application Priority Data

May 7, 2012 (EP) ..................... 12166953

(51) Int. Cl.
| | | |
|---|---|---|
| C11B 9/02 | (2006.01) | |
| B01D 61/02 | (2006.01) | |
| B01D 69/14 | (2006.01) | |
| B01D 71/70 | (2006.01) | |

(52) U.S. Cl.
CPC ............ *C11B 9/025* (2013.01); *B01D 61/027* (2013.01); *B01D 69/141* (2013.01); *B01D 71/70* (2013.01); *C11B 9/022* (2013.01)

(58) Field of Classification Search
CPC .... B01D 61/027; B01D 69/141; B01D 71/70; C11B 9/022; C11B 9/025
See application file for complete search history.

(56) References Cited

U.S. PATENT DOCUMENTS

| 5,041,227 A | 8/1991 | van Eikeren et al. | |
|---|---|---|---|
| 10,202,562 B2 * | 2/2019 | Boam | C11B 9/022 |
| 2009/0074941 A1 | 3/2009 | Finn et al. | |

FOREIGN PATENT DOCUMENTS

| CN | 102311324 A | 1/2012 |
|---|---|---|
| DE | 19835542 A1 | 2/2000 |
| DE | 2205710 A1 | 7/2010 |
| DE | 102009047351 A1 | 6/2011 |
| DE | 202011003763 U1 | 1/2012 |
| WO | 9307766 A1 | 4/1993 |
| WO | 2009033306 A1 | 3/2009 |

OTHER PUBLICATIONS

Darvishmanesh S et al "Performance of Nanofiltration Membranes for Solvent Purification in the Oil Industry" J Am Oil Chem Soc, 2011 (epub Feb. 11, 2011), 88, pp. 1255-1261; DOI 10.1007/s 11746-011-1779-y. (Year: 2011).
Bartosz Tylkowski et al., "Concentration of biologically active compounds extracted from *Sideritis* ssp. L. by nanofiltration" Food and Bioproducts Processing (2011), vol. 89, p. 307-314.
S.J. Sarrade et al., "Supercritical CO2 extraction coupled with nanofiltration separation Applications to natural products" Separation and Purification Technology (1998), vol. 14, p. 19-25.
T.U. Kim et al., "Rejection of trace organic compounds by high-pressure membranes" Water Science & Technology (2005), vol. 51, No. 6 and 7, p. 335-344.
P. Berg et al., "Removal of pesticides and other micropollutants by nanofiltration" Desalination (1997), vol. 113, p. 205-208.
Peshev et al., "Application of organic solvent nanofiltration for concentration of antioxidant extracts of rosemary (*Rosmarinus officiallis* L.)", Chemical Engineering Research and Design, 89 (2011) 318-327.
Peev et al., "Solvent extraction of rosmarinic acid from lemon balm and concentration of extracts by nanofiltration: Effect of plant pre-treatment by supercritical carbon dioxide", Chemical Engineering Research and Design, 89 (2011) 2236-2243.
XP-002680132—English Abstract for CN 102 311 324A.
Carlson et al., "Separation of D-limonene from supercritical CO2 by means of membranes", J. of Supercritical Fluids, 34 (2005) 145-147.

* cited by examiner

*Primary Examiner* — Aaron J Kosar

(74) *Attorney, Agent, or Firm* — Reed Smith LLP; Rudolf E. Hutz

(57) ABSTRACT

The present disclosure in general relates to a process for (1) reducing impurities, i.e. undesirable natural components such as waxes and undesirable synthetic materials such as agrochemicals and other environmental pollutants, or (2) fractionation of natural components present in an essential oil using at least one selective membrane.

19 Claims, 6 Drawing Sheets

MEMBRANE-BASED PROCESSES FOR SELECTIVELY FRACTIONATING ESSENTIAL OILS

This application is a continuation of U.S. patent application Ser. No. 14/399,273, filed Nov. 6, 2014, which is a United States national stage of International Application No. PCT/EP2013/055833, filed Mar. 20, 2013, which claims benefit of European Patent Application No. 12166953.5, filed May 7, 2012, each of which are herein incorporated by reference in their entirety.

The present disclosure in general relates to a process for (1) reducing impurities, i.e. undesirable natural components such as waxes and undesirable synthetic materials such as agrochemicals and other environmental pollutants, or (2) fractionation of natural components present in an essential oil using at least one selective nanofiltration membrane.

Essential oils are produced from plant materials through three main routes, distillation, extraction with a suitable hydrophobic solvent and expression (physical crushing) depending on the location of the oil within the plant material and the inherent properties of the oil. In all cases the production technique generates a solution containing a mixture of compounds. In many cases the essential oil must be removed from a second aqueous phase that is present as a result of the production process. Furthermore, the valuable components of the oil must often be further separated from unwanted materials present in produced oil to generate the final desired product.

Essential oils, including citrus oils, contain a broad range of high value chemical species, many of which have valued organoleptic properties that are used in the food and beverage industry, and the flavour and fragrance industry for example. In many applications the removal of certain natural and synthetic impurities are a key part of processing the crude essential oil. Natural impurities include components that form solid "wax" material either after extended period of standing or when the oil is cooled, these include but are not limited to high molecular weight hydrocarbons or esters, coumarins, sterols, flavonoids, etc. Furthermore, synthetic impurities that may be present in the crude oil and these include but are not limited to organic compounds extracted from packaging materials (e.g. phthalates) and agrochemicals (e.g. insecticides, fungicides, etc.).

One of the primary steps in processing many essential oils is to remove the "wax" (see Industrial Engineering and Chemistry Research 47 (2008), 9573-9580). The current state-of-the-art to remove "wax" is a process known as winterization.

Winterisation is a process known to those skilled in the art that involves refrigerating the oil to low temperature, generally in the range $-10°$ C. to $-40°$ C., allowing the wax crystals to form and grow as the temperature drops, and then settling the wax crystals under gravity. Due to the slow speed of the wax formation and the low density difference between the solid wax and crude oil, this process can take several weeks to complete and may be carried out in several stages (with the different stages optionally operating at different temperatures). The product from winterization may also be centrifuged to remove any residual wax. The multi-step nature of this process, combined with the low temperatures involved and extended process timescale, make this process energy intensive and tedious to carry out.

A further tedious task in processing many essential oils is the reduction of impurities present in the essential oil. As the impurities constitute a wide range of chemical species they cannot be reduced with just one unit operation, so the current state-of-the-art for removing synthetic impurities is through a series of independent unit operations that include use of adsorbents or washing the oil with various aqueous chemical solutions. Suitable adsorbents are known to those skilled in the art and include diatomaceous earth, activated carbons, silicas and resin beads. However, the effectiveness of these adsorbents to reduce the synthetic impurities is limited and may reduce the yield of valuable components. Aqueous chemical washes only target species in the crude oil that can be ionized to form salts with components in the aqueous solution (for example see EP0656932 and US2007237844A1), these salts are insoluble in the crude essential oil, and the salt form of the impurity is removed to the aqueous wash solution—thus reducing the concentration of the impurity in the crude essential oil. However, this approach is only efficient for impurity compounds that can be ionized or can be extracted into an aqueous phase.

The use of membranes to concentrate the valuable essential oil components from an aqueous or organic solvent system has been reported. For example, Peev et al. (Chemical Engineering Research and Design, 89 (2011), 2236-2243) discloses the use of organic solvent nanofiltration membranes for the concentration of a rosmarinic acid extract from lemon balm. Tylkowski et al. (Journal of Membrane Science 348 (2010), 124-130) report the use of organic solvent nanofiltration membranes to concentrate an aqueous ethanolic extract of propolis. This disclosure utilizes the fact that free fatty acids are more easily dissolved in ethanol than triglycerides to produce an ethanol extract enriched in free fatty acids. Thereafter, a membrane is used for separation of free fatty acids from the ethanolic extract.

The processes described above are designed to purify plant extracts comprising only some components of an essential oil but not the whole essential oil. Such plant extracts cannot be compared to feed-stocks comprising the whole essential oil, i.e. all components of the essential oil.

Carlson et al. (Journal of Supercritical Fluids 34 (2005), 143-147) disclose the application of reverse osmosis membranes to separate supercritical carbon dioxide from limonene. Sarmento et al. (Journal of Membrane Science 237 (2004), 71-76) also report the use of reverse osmosis membranes to concentrate essential oils from supercritical carbon dioxide. The disclosed reports demonstrate the capacity of membranes to retain and concentrate essential oils from a solvent matrix.

Dupuy et al. (Journal of Membrane Science 378 (2011), 203-213, and Flavour and Fragrance Journal 26 (2011), 192-203) also report the application of membranes in the form of membrane contactors to provide emulsion-free extraction of essential oil components from lemon oil into aqueous ethanolic solutions. In this process, the quality of separation is governed by the aqueous ethanolic extraction solvent and not the membrane properties. The membrane stabilizes the interface between the lemon oil and the aqueous ethanolic solution.

The recovery of essential oil aroma compounds from solid/liquid matrices using membrane technology is also known. Pervaporation can be applied to recover aroma compounds under mild conditions (for example Figoli et al. (Desalination 199 (2006) 111-112 and Desalination, 193 (2005), 160-165).

Han et al. have applied microfiltration membranes to the separation of essential oil-water mixtures (Zhongguo Zhongyao Zazhi 36(1) (2011), 41-44). The separation generates an aqueous permeate and the essential oil is concentrated as a second phase in the retentate. Sakamoto et al. (Food Science and Technology Research, 9(1) (2003), 11-16) describes a similar separation of a two-phase water/essential oil mixture using ceramic ultrafiltration and microfiltration membranes to generate an aqueous permeate and a retentate containing a second phase of the essential oil.

EP2205710 to Givaudan describes a membrane-based process to dewax citrus oils. The process described in the patent utilises either ultrafiltration or microfiltration membranes to remove wax compounds from citrus oils, such that they do not generate further solid wax when left to stand at 4 deg C. for 48 hours. The citrus oil is chilled to about 10 deg C. prior to filtration to enhance the ease with which the wax compounds can be filtered.

Essential oils encompass a very broad range of non-lipid natural oils derived from plant matter, e.g. citrus oils, rosemary oil, lemongrass oil, lavender oil, eucalyptus oil, etc. Given the variety of feedstocks, crude essential oils contain the desired essential oil components (e.g. terpenic hydrocarbons, aldehydes, alcohols, esters, etc.) as well as a range of unwanted impurities—for instance wax compounds (often associated with the cuticle of the feedstock), agrochemical residues (from the farming of the feedstock). These unwanted materials are often challenging or tedious to separate from the desired compounds and often multi-step, energy-consuming processes are required to generate the desired products. Furthermore, the most valuable compounds in the essential oil are often thermally sensitive, and it is a significant challenge to isolate these compounds at high yield without incurring thermal damage.

There thus remains a need in the art for a more efficient process for remove impurities or fractionate compounds from an essential oil such as a citrus oil.

Problem of the present invention was therefore to provide a process for refining essential oils which does not have the drawbacks of the prior art processes discussed above or has such drawbacks only to a reduced degree.

A special problem of the present invention was to provide a process which may achieve the combined effect of one, two, three or more of the conventional processing steps applied to essential oils (for instance dewaxing, colour removal (adsorption), fractionation, agrochemical removal) in a single process. The disclosed process should therefore simplify and/or speed up the production of an essential oil and potentially improve oil yield and quality.

Another problem was to provide a flexible process which allows to remove impurities from an essential oil and/or to be used for fractionating at least one component of the oil, resulting in the formation of an enriched concentrate solution of the at least one natural component. This may lead to the production of new products.

A special problem of the present invention was to provide a process to purify essential oils in a more economical way from wax and synthetic impurities while avoiding as much as possible negative effects on the flavour/fragrance profile of the essential oil product.

Further special problems are:
To ensure sufficient high capacities (flow rates)
  To separate flavour/fragrance substances from synthetic impurities which have a molecular weight in the same dimension, i.e. 130 to 300 Da. To save process steps compared to prior art processes.
To save energy (working at ambient temperature)
To have a stable process without membrane fouling.

Further problems not explicitly described above are obvious for one skilled in the art in view of the description, claims, examples and drawings of the present application.

The problems of the present invention are solved by a process according to claim 1 of the present invention.

Preferred embodiments are claimed in dependent claims and/or are described in detail in the subsequent description, examples and figures.

In particular the present disclosure relates to a process for (1) reducing impurities, i.e. undesirable natural components such as waxes and undesirable synthetic materials such as agrochemicals and other environmental pollutants, or (2) fractionation of natural components present in an essential oil comprising (a) optionally mixing the essential oil with an organic solvent to form a solution; (b) contacting the essential oil or the solution with at least one selective nanofiltration membrane, wherein a retentate is formed comprising at least one compound from the essential oil and a permeate forms comprising at least one compound from the essential oil such that the composition of the retentate and permeate solutions is different; and (c) optionally removing the organic solvent from the retentate to form a purified oil.

This solution was not obvious in view of the cited prior art, in particular in view of Givaudan (EP2205710) who recommends using ultrafiltration membranes (molecular weight cut-off in the range 2,000 Da to 2,000,000 Da) or microfiltration (pore diameter 0.2 micron and larger). Obviously Givaudan believed that applying nanofiltration would adversely affect the flavour/fragrance profile of the essential oil product (the valuable organoleptic compounds are typically in the molecular weight range 130 to 300 Da). The inventors of the present invention, however, could show that this is not the case.

Another unexpected effect of the present invention was that nanofiltration membranes have much better dewaxing properties compared to ultrafiltration or microfiltration membranes. The test for successful dewaxing applied by Givaudan (standing for 48 hours at 4 deg C.) is too mild to define successful dewaxing. Dewaxing a citrus oil with the process of the invention, versus an ultrafiltration membrane of Givaudan, when applying a more rigorous −20 deg C. dewaxing test shows, that at −20 deg C. a solution from an ultrafiltration process is cloudy, whereas solutions produced according to the invention are transparent.

Another unexpected advantage of the present invention was that sufficient flux, up to at least 5 L.m-2.h-1 could be realized. This is beneficial for an economic process.

There is no chilling or "winterization" necessary for the present invention. It is also not necessary to cool the essential oil solution to 10 deg C. or lower. The process of the invention can be operated at ambient temperature, which saves time and energy.

In contrast to the state of the art processes, the process of the invention allows to save process steps and even though synthetic impurities have a molecular weight <500 Da, it allows to simultaneously dewax and remove synthetic impurities. This is another important and unexpected advantage.

It is to be understood that both the foregoing general description and the following detailed description are exemplary and explanatory only and are not restrictive of the disclosure, as claimed.

DESCRIPTION

Figure 1:
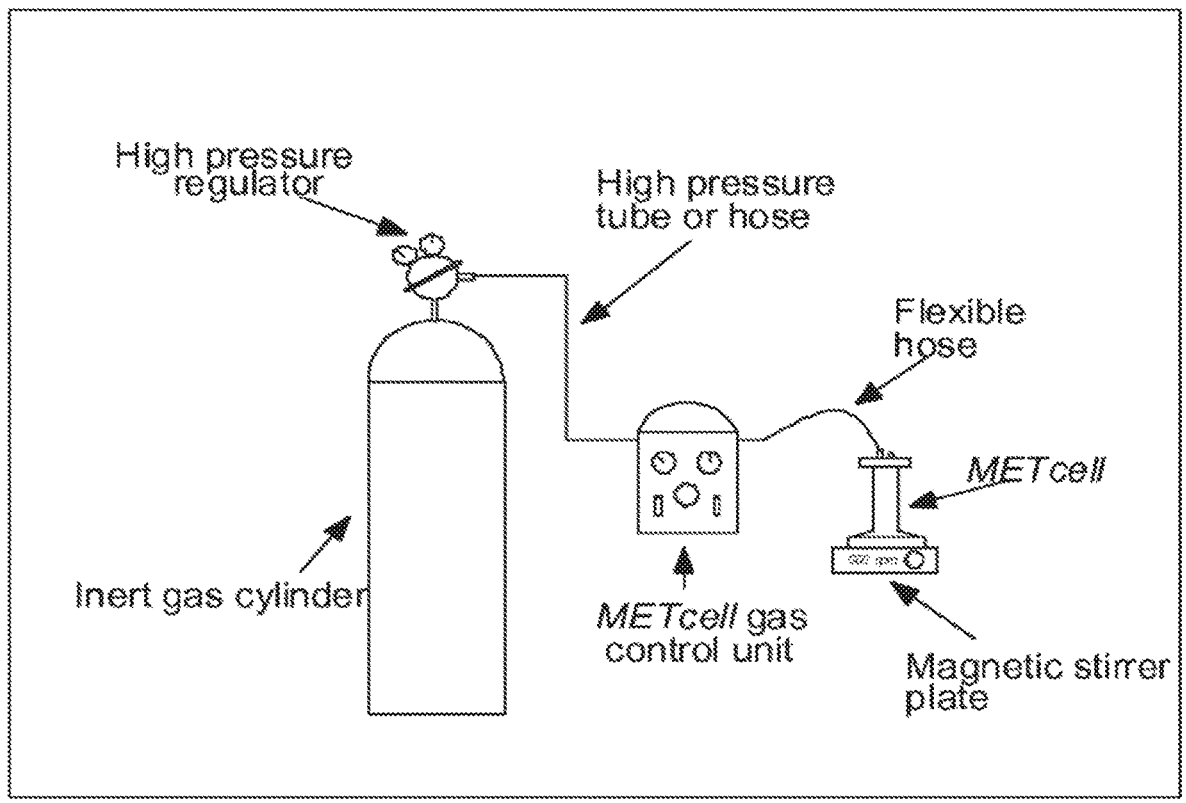
FIG. 1 is a schematic of the cross-flow nanofiltration system, as used in Example 1 (METcell dead-end filtration system).

Particular aspects of the invention are described in greater detail below. The terms and definitions used in the present application and as clarified herein are intended to represent the meaning within the present disclosure. The patent and scientific literature referred to herein and referenced above is hereby incorporated by reference. The terms and definitions provided herein, if in conflict with terms and/or definitions incorporated by reference, are the terms and definitions that should be used for interpreting the present disclosure.

The singular forms "a," "an," and "the" include plural reference unless the context dictates otherwise.

The terms "approximately" and "about" mean to be nearly the same as a referenced number or value. As used herein, the terms "approximately" and "about" should be generally understood to encompass ±30%, preferably ±20%, particular preferred ±10% and especially preferred ±5% of a specified amount, frequency or value.

The term "essential oil" as used in this disclosure shall be taken to mean hydrophobic oils derived from plant matter, that contain less than 40% by weight, preferably less than 30')/0 by weight, particular preferred less than 20% by weight, very particular preferred less than 10% by weight, especially preferred less than 5% by weight, very especially preferred less than 1% by weight and most preferred 0% by weight of lipids or lipid oils. Lipids are compounds based on fatty acids and derivatives of fatty acids. Lipid oils are defined to be oils based on fatty acids and derivates of fatty acids (such as glyceride oils), whereas many essential oils have a base of terpene hydrocarbons. Examples of essential oils include citrus oils, mint oils, cedarwood oil, eucalyptus oil, clove oil, etc. Examples of vegetable lipid oils include sunflower oil, olive oil, peanut oil, soya oil, corn oil, etc. In some embodiments, the term "essential oil" shall also be taken to encompass mixtures of more than one "essential oil".

In more detail an essential oil is a concentrated, hydrophobic liquid containing volatile aroma compounds extracted from plants. Essential oils are composed primarily of terpenes and of lesser quantities of alcohols, aldehydes, esters, phenols, and other compounds that impart particular odours or flavours. They are usually obtained from plants, leaves, flowers, roots, buds, twigs, rhizomes, heartwood, bark, resin, seeds and fruits. Essential Oils are usually found in special secretory glands or cells within the plants. The aromatic substances are formed and stored in certain organs of a plant as a by-product or because of its metabolism. Each essential oil contains its own blueprint of chemical entities that is absolutely unique to that specific oil.

Different techniques are known to obtain essential oils from plants. Essential oils as used for feed-stock in the present invention are produced by distillation, expression, or solvent extraction with hydrophobic solvents or supercritical solvents. Essential oils are used in perfumery, aromatherapy, cosmetics, incense, medicine, household cleaning products, and for flavouring food and drink. They are valuable commodities in the fragrance and food industries. They are not to be confused with essential fatty acids or with plant extracts prepared with more polar solvents comprising only the more polar components of the essential oil.

In a first preferred embodiment of the invention essential oils are oils according to ISO 9235, i.e. are products obtained from a natural raw material of plant origin:
  either by steam distillation;
  or by mechanical processes from the epicarp of Citrus fruits;
  or by dry distillation
after separation of the aqueous phase, if any, by physical processes.

In a second preferred embodiment of the present invention, essential oils encompass the essential oils according to the first preferred embodiment and also essential oils that may be obtained by mechanical expression from plants material other than Citrus fruits.

In a third preferred embodiments of the present invention, essential oils encompass the essential oils of the first and second preferred embodiment and also essential oils that are obtained by extraction of the plant material with supercritical solvents, preferably supercritical $CO_2$.

In a fourth preferred embodiments of the present invention, essential oils encompass the essential oils of the first, second and third preferred embodiment and also essential oils that are obtained by extraction of plants with a non polar solvent, i.e. a solvent with a dielectric constant, measured as the ratio of the electrical capacity of a capacitor filled with the solvent to the electrical capacity of the evacuated capacitor (at room temperature), of less than or equal to 15, preferably less than or equal to 10, particular preferred less than or equal to 5 and very particular preferred less than or equal to 3. List of dielectric constants of solvents are for example available A. Maryott et al., "Table of Dielectric Constants of Pure Liquids", United States Department of Commerce, National Bureau of Standards Circular 514, 1951.

In the third and fourth preferred embodiment of the present invention crude products are obtained after extraction of the plant material with the non-polar solvent. In many cases these extracts are called "concrete" and may contain significant amounts of waxes, resins and other lipophilic plant material. The concrete may directly be dissolved in an organic solvent and used for the process of the present invention; it may on the other hand be further treated in mechanical or extractive purification steps to obtain an organic essential oil solution that is used in the present invention.

In general crude essential oils or pre-purified essential oil obtained by the processes described above can be used as feed-stock for the process of the present invention.

The term "fatty acid(s)" includes for example short-chain and long-chain saturated and unsaturated (e.g., monounsaturated and polyunsaturated) hydrocarbons comprising one carboxylic acid group. Derivatives of fatty acids include fatty acid esters, glycerides, phosphoesters, etc.

The term "fractionation" as used in this disclosure shall be understood to mean that the concentration of a given species in solution is different in the retentate and permeate solutions generated by applying the process described herein. It will be understood by one skilled in the art that this means a given species could "fractionate" into either the permeate or retentate solutions, and furthermore that "fractionation" as defined here can incorporate enrichment, depletion, complete removal and complete capture of a species in either the retentate of permeate solutions.

The term "nanofiltration" as used in this disclosure shall be taken to mean a synthetic membrane that provides a nominal molecular weight cut-off in the range 150 g.morl to 1,500 g.morl, where nominal molecular weight cut-off means the molecular weight at which the membrane provides a 90% rejection of a series of polystyrene oligomers (for example polystyrene polymer standards nominal Mp of 1,000 (part number PL2012-3010) and nominal Mp 580 (part number PL2012-2010) from Agilent Technologies) according to the method described in See Toh et al, (Journal of Membrane Science, 291(1-2) (2007), 120-125). Nanofiltration membranes differ from ultrafiltration membranes (molecular weight cut-off in the range 2,000 Da to 2,000,000 Da) and microfiltration membranes (pore diameter 0.2 micron and larger).

The term "natural impurity" as used in this disclosure shall be taken to mean any chemical species that is naturally occurring in the feedstock, but which is not a desired species in the final form of the essential oil. Typical examples can include waxes (as they may lead to undesirable cloudiness in the oil product), colour compounds (which may not be desired if the oil is to be blended into a product of a different colour), sterols and vitamins.

The term "rejection" is defined by equation (1), where CID; is the concentration of species i in the permeate solution, "permeate" being the liquid which has passed through the membrane, and CR1 is the concentration of species i in the retentate solution, "retentate" being the liquid which has not passed through the membrane. It will be understood by one skilled in the art that a rejection of 0% implies that the membrane offers no separation of species i, and a rejection of 100% implies that species i is completely retained. It will be further recognised by one skilled in the art that provide the rejection of species A does not equal the rejection of species B then the species can be fractionated, as defined herein.

$$R_i = \left(1 - \frac{C_{Pi}}{C_{Ri}}\right) \times 100\% \quad (1)$$

The term "synthetic impurity" as used in this disclosure shall be taken to mean any chemical species that is not naturally occurring in the feedstock from which the essential oil is produced. It will be understood by one skilled in the art that synthetic impurity can incorporate both man-made and naturally occurring compounds that are applied as agrochemicals or are present as environmental pollutants.

The term "waxes" as used in this disclosure shall be taken to mean naturally occurring species in the essential oil that are able to impart cloudiness to the oil product at temperatures below 20 deg C. Typical wax compounds found in essential oils include long-chain aliphatic hydrocarbons (typically C14 or longer), long-chain alcohols (typically C14 or longer), and related ketones, aldehydes, acids, diols, etc., and coumarins, sterols, flavonoids.

Essential Oils

The term essential oil has already been defined in paragraphs 38 to 46 above. In subsequent paragraphs more details about the essential oils and their use are provided.

An essential oil according to the present disclosure is derived from plant matter. In some embodiments of the present disclosure, the essential oil may comprise of a mixture of more than one essential oil. The essential oil may derive from several different parts of the plant, including by way of non-limiting example berries, seeds, bark, wood, rhizome, leaves, resin, flowers, peel and root.

Preferred essential oils are derived from the genus Citrus. Particular preferred essential oils are selected from oils deriving from sweet orange, orange, lemon, lime, grapefruit, bergamot, key lime, pomelo, citron, mandarin, tangerine, bitter orange, rangpur, Persian lime, Clementine, yuzu, kaffir lime, ugli.

Essential oils include by way of non-limiting example allspice oil, juniper oil, cumin oil, cinnamon bark oil, camphor oil, rosewood oil, ginger oil, basil oil, eucalyptus oil, lemongrass oil, peppermint oil, rosemary oil, spearmint oil, tea tree oil, frankincense oil, chamomile oil, clove oil, jasmine oil, lavender oil, rose oil, ylang ylang oil, bergamot oil, grapefruit oil, lemon oil, lime oil, orange oil, and valerian oil.

Essential oils are a rich source of a wide variety of natural compounds that have found numerous applications. Bakkali et al. (Food and Chemical Toxicology 46 (2008) 446-475) review the many uses of essential oils—these include bactericidal, virucidal, fungicidal, antiparasitical, insecticidal, medicinal, cosmetic, and flavour/fragrance applications. For example, many components in essential oils alter the composition of the cell wall of common bacterial/fungal pathogens which may be lethal to the microorganism or make it much easier for other antimicrobial compounds to function. A further example of the benefits of essential oils includes their antioxidant and prooxidant capabilities, which can help protect cells but also eliminate damaged cells through enhancing apoptosis.

A number of essential oils also contain compounds with potent pharmaceutical activities. These include artemisinin, which is an anitmalarial compound derived from Artemisia annua, hyperforin, which is an antidepressant drug derived from Hypericum perforatum, as well as various sterols ("Supercritical Fluid Extraction of Nutraceuticals and Bioactive Compounds", ed. J. L. Martinez (2008) ISBN 978-0-8493-7089-2).

Other essential oils primarily have their use as sources of compounds for flavour/fragrance applications. These are primarily the citrus oils such as the orange oils, lemon oil, lime oil, bergamot oil, etc. but also oils such as lavender oil and rose oil are used in these applications.

Membrane

Suitable selective membranes for use according to the present disclosure include polymeric and ceramic membranes, and mixed polymeric/inorganic membranes.

The at least one selective membrane used in the process of the present invention may be formed from any polymeric or ceramic material which provides a separating layer capable of fractionating the essential oil content or separating the desired essential oil content from at least one natural and/or synthetic impurity present in the essential oil. For example, the at least one selective membrane may be formed from or comprise a material chosen from polymeric materials suitable for fabricating nanofiltration membranes, including preferably polyethylene, polypropylene, polytetrafluoroethylene (PTFE), polyvinylidene difluoride (PVDF), polysulfone, polyethersulfone, polyacrylonitrile, polyamide, polyimide, polyamideimide, polyetherimide, cellulose acetate, polyaniline, polypyrrole, polyetheretherketone (PEEK), polybenzimidazole, and mixtures thereof. The at least one selective membrane can be made by any technique known to the art, including sintering, stretching, track etching, template leaching, interfacial polymerization, or phase inversion. In a preferred embodiment the at least one selective membrane may be crosslinked or treated so as to improve its stability in the reaction solvents. For example, by way of non-limiting example, the membranes described in GB2437519, the contents of which are incorporated herein by reference, may be used in this disclosure.

In a further preferred embodiment, the at least one selective membrane is a crosslinked or none crosslinked composite material comprising a support and a thin, selectively permeable layer. The thin, selectively permeable layer may, for example, be formed from or comprise a material chosen from modified polysiloxane based elastomers including polydimethylsiloxane (PDMS) based elastomers, ethylenepropylene diene (EPDM) based elastomers, polynorbornene based elastomers, polyoctenamer based elastomers, polyurethane based elastomers, butadiene and nitrile butadiene rubber based elastomers, natural rubber, butyl rubber based elastomers, polychloroprene (Neoprene) based elastomers, epichlorohydrin elastomers, polyacrylate elastomers, polyethylene, polypropylene, polytetrafluoroethylene (PTFE), polyvinylidene difluoride (PVDF) based elastomers, polyetherblock amides (PEBAX), polyurethane elastomers, crosslinked polyether, polyamide, polyaniline, polypyrrole, and mixtures thereof In an especially preferred embodiment of the present invention at least one selective nanofiltration membrane or nanofiltration composite membrane is used comprising a polyimide, particular preferred is a polyimide subject to post-formation crosslinking and impregnation with a low volatility compound. Very particularly preferred are polyimides according to GB2437519 and Soroko et al. (Journal of Membrane Science, 381(1-2) (2011), 152-162) the contents of which are incorporated herein by reference.

Particularly preferred are silicone-coated organic solvent nanofiltration membranes especially on the basis of polyimide nanofiltration membranes. Most particular preferred membranes as for example described in DE10 2009 07 351 or disclosed in International Patent Application WO2012010889, the contents of which are incorporated herein by reference, may be used in this disclosure. The inventors found out that especially when using silicone-coated organic solvent nanofiltration membranes dewaxing and reduction in concentration of certain synthetic impurities can be performed at ambient and above-ambient temperature conditions without the membrane fouling or the organoleptic properties of the essential oil being affected.

Without being bound to any theory, the inventors are of the opinion, that the silicone coating minimizes deposition of waxy compounds on the membrane surface, thus minimizing fouling which leads to stable membrane performance over time.

Another advantage, that silicone coated membranes seem to achieve compared to uncoated membranes is, that the solution-diffusion nature of mass transport in silicone coatings means that these membranes offer discrimination between the essential oil components and certain synthetic impurities of similar molecular weight that is not achieved to this degree with phase inversion membranes.

In another embodiment, the at least one selective membrane is prepared from an inorganic material such as, for example, silicon carbide, silicon oxide, zirconium oxide, titanium oxide, and zeolites, using any technique known to those skilled in the art such as sintering, leaching, or sol-gel processing.

In a further embodiment, the at least one selective membrane comprises a polymer membrane with dispersed organic or inorganic matrices in the form of powdered solids present at amounts up to 20 wt % of the polymer membrane. Carbon molecular sieve matrices can be prepared by pyrolysis of any suitable material as described in U.S. Pat. No. 6,585,802.

Zeolites as described in U.S. Pat. No. 6,755,900 may also be used as an inorganic matrix. Metal oxides, for example, titanium dioxide, zinc oxide, and silicon dioxide may be used, such as the materials available from Evonik Industries AG (Germany) under their AEROSIL and ADNANO trademarks. Mixed metal oxides such as mixtures of cerium, zirconium, and magnesium may also be used. In at least one embodiment, the matrices will be particles less than 1.0 micron in diameter, for example less than 0.1 microns in diameter, such as less than 0.01 microns in diameter.

It is particularly preferred in all embodiments of the present invention that at least one selective membrane having a molecular weight cut-off ranging from about 150 g.mol-1 to about 1,500 g.mol-1, preferably from about 200 g.mol-1 to about 800 g.mol-1 and particular 200 g.mol-1 to less than or equal to 600 g.mol-1 is used in the process of the invention.

In a special embodiment more than one membrane respectively more than one membrane separation step are comprised in the process of the invention. In this special embodiment it is particularly preferred that two different membranes having two different molecular weight cut-offs are used. Very particularly preferred at least one membrane having a molecular weight cut off between 400 g.mol-1 and 1500 g.mol-1, especially between 500 g.mol-1 and 800 g.mol-1 and at least one membrane with a different molecular weight cut-off between 150 g.morland 600 g.mol-1, especially between 200 g.mol-1 and 500 g.mol-1 are used. That the ranges mentioned before overlap does not mean that the membranes are identical, in contrast, it has to be understood that a membrane having a molecular weight cut-off of 400 g.morl can be combined with a membrane having a molecular weight cut-off of 600 g.mol-1.

Impurities

Essential oils may contain undesirable natural impurities or undesirable synthetic impurities, that must be removed from the essential oil for its' desired use. The disclosed method can effectively remove a wide range of natural and synthetic impurities, thereby producing oils suitable for their desired applications.

The process disclosed herein describes separating impurities from an essential oil, resulting in oil having impurity levels within desired and/or regulatory limits for, for instance, human consumption.

The concentration and composition of the impurities found in the essential oil can vary. For example, an essential oil composition may vary based on species from which the oil derives part of the plant from which the oil derives geographical location where the plant is grown, harvesting season, etc. In some instances, the targeted impurities may be absent or below the detection limit, but if the oil is concentrated, the impurities may also be concentrated.

The impurities present in the essential oil may be natural or synthetic impurities such as, by way of non-limiting example, environmental pollutants, agrochemical residues, extractables from packaging, plant sterols, lipohilic hormones, waxes, coloured components, oxidation products, vitamins, and components that create unwanted smell and taste in the oil, such as aldehydes and/or ketones. In at least one embodiment, the removal of coloured components results in an oil having improved colour, and removal of components that create unwanted smell and taste result in an oil having an improved organoleptic profile.

The term "environmental pollutants" includes, but is not limited to, for example, polychlorinated biphenyls (PCBs), polybrominated diphenyl ethers (PBDEs), polycyclic aromatic hydrocarbons (PAHs), hexachlorocyclohexanes (HCHs), dichlorodiphenyltrichloroethane (DDT), dioxins, furans, non-ortho-PCBs, and metals.

The term "agrochemical residues" includes by way of non-limiting example, pesticides and their breakdown products. Chlorinated pesticides includes, for example, lindane, endrin, dieldrin, aldrin, isodrin, heptachlor-exo-epoxide, heptachlor-endo-epoxide, trans-chlordane, cis-chlordane, oxy-chlordane, chlordane, heptachlor, endosulfan-1, and mirex. Other types of pesticide include organophosphorous pesticides, such as by way of non-limiting example parathion, malathion, methyl parathion, chlorpyrifos, diazinon, dichlorvos, phosmet, fenitrothion tetrachlorvinphos, and azinphos methyl, and carbamate pesticids, such as by way of non-limiting example aldicarb, carbofuran (Furadan), carbaryl (Sevin), ethienocarb, and fenobucarb.

"Natural impurities" may include by way of non-limiting example, sterols, lipophilic hormones, and natural colours, for instance belonging to the carotenoids.

Extractables from packaging may include by way of non-limiting example compounds such as plasticisers (e.g. phthalates), unbound resin components, unbound oligomeric material from polymers, lubricants, etc.

Process for Reducing Impurities and Process for Partitioning Natural Component(s)

Some embodiments of the present disclosure relate to a process for reducing impurities from an essential oil using at least one selective membrane. Additionally, some embodiments of the present disclosure relate to a process for fractionating at least one natural component from an essential oil using at least one selective membrane According to one embodiment, fractionation of the undesirable natural and synthetic impurities may be achieved through contacting the oil solution with at least one selective membrane that retains the undesirable impurities, i.e., in the form of a retentate, and allows permeation of the desired essential oil compounds, i.e., in the form of a permeate. Content permeates through the membrane due to, e.g., a trans-membrane pressure. In at least one embodiment, the trans-membrane pressure ranges from 1 to 100 bar. Preferably the trans-membrane pressure may range from 5 to 75 bar, particular preferred 10 to 60 bar.

Fractionation of the essential oil may be achieved through contacting the oil solution with at least one selective membrane. The essential oil is then fractionated with at least one species having a different concentration in the retentate solution than in the permeate solution. Content permeates through the membrane due to, e.g., a trans-membrane pressure. In at least one embodiment, the trans-membrane pressure ranges from 1 to 100 bar. Preferably the trans-membrane pressure may range from 5 to 75 bar, particular preferred 10 to 60 bar.

According to a further embodiment, the essential oil is mixed with an organic solvent to form a homogeneous solution of oil and solvent. The mixing may be achieved by any technique known to one skilled in the art, such as, for example, via static inline mixer, dynamic inline mixer, and/or mixing vessel containing a mechanical stirrer. Preferably, the solution may contain the essential oil in an amount ranging from 1 to 95% v/v, particularly preferred from 5 to 50% v/v.

The term "organic solvent" when applied to the solvents used to prepare the mixture of essential oil and organic solvent includes, for example, an organic liquid with molecular weight less than 300 Daltons. The term "solvent" includes a mixture of organic solvents, as well as a mixture of organic solvents and water.

Preferred examples are, solvents including aromatic hydrocarbons, aliphatic hydrocarbons, ketones, glycols, chlorinated solvents, esters, ethers, amines, nitriles, aldehydes, alcohols, phenols, amides, carboxylic acids, alcohols, furans, lactones and dipolar aprotic solvents, and mixtures thereof and with water.

Other preferred examples are, solvents including toluene, xylene, benzene, styrene, anisole, chlorobenzene, dichlorobenzene, chloroform, dichloromethane, dichloroethane, methyl acetate, ethyl acetate, isopropyl acetate, butyl acetate, methyl ether ketone (MEK), methyl iso butyl ketone (MIBK), acetone, ethylene glycols, ethanol, methanol, isopropanol, propanol, butanol, hexane, heptane, cyclohexane, dimethoxyethane, methyl tert butyl ether (MTBE), diethyl ether, adiponitrile, N,N dimethylformamide, dimethylsulfoxide, N,N dimethylacetamide, dioxane, nitromethane, nitrobenzene, pyridine, carbon disulfide, tetrahydrofuran, methyl-tetrahydrofuran, N-methyl pyrrolidone, N-ethyl pyrrolidone, acetonitrile, and mixtures thereof and with water.

Particular preferred solvents are selected from the group consisting of methanol, ethanol, isopropanol, ethyl acetate, acetone, hexane, heptane, ethylene glycols, and mixtures thereof and with water.

Reduction of the undesirable natural and synthetic impurities may be achieved through contacting the solvent-oil solution or the essential oil with at least one selective nanofiltration membrane that retains the undesirable impurities, i.e., in the form of a retentate, and allows permeation of the desired essential oil compounds, i.e., in the form of a permeate. Content permeates through the membrane due to, e.g., a trans-membrane pressure. In at least one embodiment, the trans-membrane pressure ranges from 1 to 100 bar. Preferably, the trans-membrane pressure may range from 5 to 75 bar, particularly preferred 10 to 60 bar.

Fractionation of the essential oil may be achieved through contacting the solvent-oil solution with at least one selective nanofiltration membrane. The essential oil is then fractionated with at least one species having a different concentration in the retentate solution than in the permeate solution. Content permeates through the membrane due to, e.g., a trans-membrane pressure. In at least one embodiment, the trans-membrane pressure ranges from 1 to 100 bar. Preferably the trans-membrane pressure may range from 5 to 75 bar, particularly preferred 10 to 60 bar.

In one aspect, the present disclosure provides a process for reducing natural impurities (e.g. waxes, oxidation products, and colored components) and synthetic impurities (e.g. agrochemical residues, packaging extractables, etc.) present in an essential oil by applying membrane nanofiltration, comprising the steps of: (i) providing an essential oil ; (ii) providing at least one selectively permeable nanofiltration membrane having a first surface and a second surface; (iii) separating the oil from the impurities by transferring the essential oil from the first surface to the second surface across the at least one nanofiltration membrane(s) through contacting the essential oil with the first surface, wherein the pressure at the first surface is greater than the pressure at the second surface, and wherein the membrane(s) is/are selectively permeable membrane(s) such that the membrane rejection (Rimp) of the impurities is greater than the rejection (R0,1) of the oil species.

In a further aspect, the present disclosure provides a process for reducing natural impurities (e.g. waxes, oxidation products, and colored components) and synthetic impurities (e.g. agrochemical residues, packaging extractables, etc.) present in a solution of a solvent and an essential oil by applying membrane nanofiltration, comprising the steps of: (i) providing a homogeneous solution of an organic solvent and an essential oil ; (ii) providing at least one selectively permeable nanofiltration membrane having a first surface and a second surface; (iii) separating the oil solution from the impurities by transferring the essential oil solution from the first surface to the second surface across the at least one nanofiltration membranes through contacting the essential oil solution with the first surface, wherein the pressure at the first surface is greater than the pressure at the second surface, and wherein the membrane(s) is/are selectively permeable membrane(s) such that the membrane rejection (Rimp) of the impurities is greater than the rejection (R0,1) of the oil species.

The disclosed method can also be used to fractionate at least one natural component in the essential oil, such as one or more of the terpenic or oxygenated components of the essential oil, fat soluble vitamins, plant sterols, and/or colored components, using the disclosed selective nanofiltration membranes, resulting in the formation of a concentrate comprising the at least one natural component at a higher concentration than in the essential oil feedstock. The fractionation is carried out by applying membrane nanofiltration, comprising the steps of: (i) providing an essential oil ; (ii) providing at least one selectively permeable nanofiltration membrane having a first surface and a second surface; (iii) separating the one or more components to be fractionated from the other components of the essential oil from by passing components from the first surface to the second surface across at least one nanofiltration membrane by contacting the essential oil with the first surface, wherein the pressure at the first surface is greater than the pressure at the second surface, and wherein the nanofiltration membrane(s) is/are selectively permeable membrane(s) such that the membrane rejection (Rcomp) of the components to be fractionated does not equal the rejection (R01) of the other oil components.

In a further embodiment, the disclosed method can also be used to fractionate at least one natural component in the essential oil, such as one or more of the terpenic or oxygenated components of the essential oil, fat soluble vitamins, plant sterols, and/or colored components, using the disclosed selective nanofiltration membranes, resulting in the formation of a concentrate comprising the at least one natural component at a higher concentration than in the essential oil feedstock wherein the essential oil is dissolved in an organic solvent. The fractionation is carried out by applying membrane nanofiltration, comprising the steps of: (i) providing a solution of an organic solvent and an essential oil; (ii) providing at least one selectively permeable nanofiltration membrane having a first surface and a second surface; (iii) separating the one or more components to be fractionated from the other components of the essential oil solution by passing components from the first surface to the second surface across at least one nanofiltration membrane by contacting the essential oil solution with the first surface, wherein the pressure at the first surface is greater than the pressure at the second surface, and wherein the nanofiltration membrane(s) is/are selectively permeable membrane(s) such that the membrane rejection (Rcomp) of the components to be fractionated does not equal the rejection (R011) of the other oil components.

In a further embodiment, the process of the invention comprises subjecting the retentate oil or solution and/or the permeate oil or solution to at least one additional processing step, preferably at least one further membrane separation step.

In a particular preferred embodiment, the process disclosed herein can be applied in multiple stages. By way of non-limiting example, a second stage further comprises providing the retentate from a first filtration that has been carried out to reduce the concentration of an impurity; passing the first retentate solution across at least one further selective membrane, preferably also a nanofiltration membrane, wherein a second retentate and a second permeate are formed wherein further impurity reduction has been carried out. In yet another embodiment, the process disclosed herein further comprises providing the permeate from a first filtration that has been carried out to reduce the concentration of an impurity; and passing the permeate solution across at least one further selective membrane, preferably also a nanofiltration membrane, wherein a second retentate and a second permeate are formed wherein further impurity reduction has been carried out Optionally, the processed essential oil may be treated with at least one adsorption process to remove additional components and/or remaining impurities. By way of non-limiting example, the processed essential oil is treated with activated carbon, which, for example, may remove further environmental pollutants present in the essential oil. In further additional steps, the essential oil may be subject to additional separation processes to enhance the fractionation or remove additional impurities. Additional purification processes may include, for example, liquid-liquid extraction processes, fractional distillation, high pressure liquid chromatography, supercritical chromatography, or resin or ion exchange adsorption depending on the application.

Components of some essential oils are known to be vulnerable to thermal degradation. Compared to other known methods for the removal of natural and synthetic impurities, the method disclosed herein may be performed effectively at near-ambient or sub-ambient temperature conditions. Many of the other known methods of impurity removal involve higher temperatures, which may be harmful to the thermally-sensitive components, i.e. the thermally-sensitive components are converted to different chemical species which reduces their yield and may also change the organoleptic properties or efficacy of the essential oil. The process of the present invention can preferably be carried out at 10 to 50 deg C.

It will be understood by one skilled in the art that the disclosed method also relates to a process for reducing the amount of at least one component in an essential oil composition thus generating a concentrate of the at least one component. The resulting concentrate(s) comprising at least one desired natural component may be used directly as a product in its own right, or it can be used as an intermediate that is subject to further separation processes, such as for instance chromatographic methods or crystallisation.

It will be understood by one skilled in the art that the embodiments described above are not limiting examples and within the spirit of this disclosure the embodiments can also be combined and applied in different sequences to achieve a desired product essential oil composition.

Resulting Composition(s)

The present disclosure also relates to compositions resulting from the process disclosed herein. Such compositions may include the retentate, the purified oil, and/or the permeate material.

For instance, in at least one embodiment, the disclosed process produces dewaxed essential oil. In at least one other embodiment, the disclosed process produces a 90% reduction in at least one impurity, for example agrochemical residues, relative to the feed essential oil.

In a further embodiment, the colour of the essential oil is reduced for example from brown to pale yellow.

In yet another embodiment, the essential oil is processed to reduce the concentration of impurities in the oil. In such an embodiment, the disclosed process may produce a composition, such as the retentate, comprising an increased concentration of at least one of plant sterols, fumarocumarins, hormones, and natural colours, such as beta-carotene, compared to the feed essential oil.

In yet another embodiment, the essential oil is processed to fractionate a component of the essential oil. In such an embodiment, the disclosed process may produce a composition, such as the retentate, comprising an increased concentration of at least one of the components of the essential oil such as a-,13-sinensal or nootkatone, compared to the feed essential oil.

The examples disclosed below are provided for a deeper understanding and clarification of the present invention. They, however, may not be construed to restrict the scope of the invention in any way

EXAMPLES

Example 1

Colour Removal from Single-Fold Orange Oil

A dead-end METcell filtration cell (Evonik Membrane Extraction Technology Ltd, UK) containing a coupon of PuraMemIlvi 5380 organic solvent nanofiltration membrane (Evonik Membrane Extraction Technology Ltd., UK) was used for this experiment—see FIG. 1 for a schematic diagram of the METcell dead-end filtration system. PuraMem™ 5380 is a silicone-coated membrane prepared according to DE10 2009 047 351 with a nominal molecular weight cut-off of 600 g.orl. The membrane was made ready for use by filtering 200 mL of limonene (Sigma-Aldrich, Germany) at ambient temperature and 30 bar filtration pressure to remove the conditioning agent (preservative) from the PuraMerevi S380 membrane.

Once the membrane was ready, the filtration cell was emptied and refilled with 100 mL of single-fold orange oil. The single-fold orange oil was filtered at a temperature of 30 deg C. and filtration pressure of 30 bar. 75 mL of the oil was permeated and collected in 25 mL aliquots.

Figure 2:
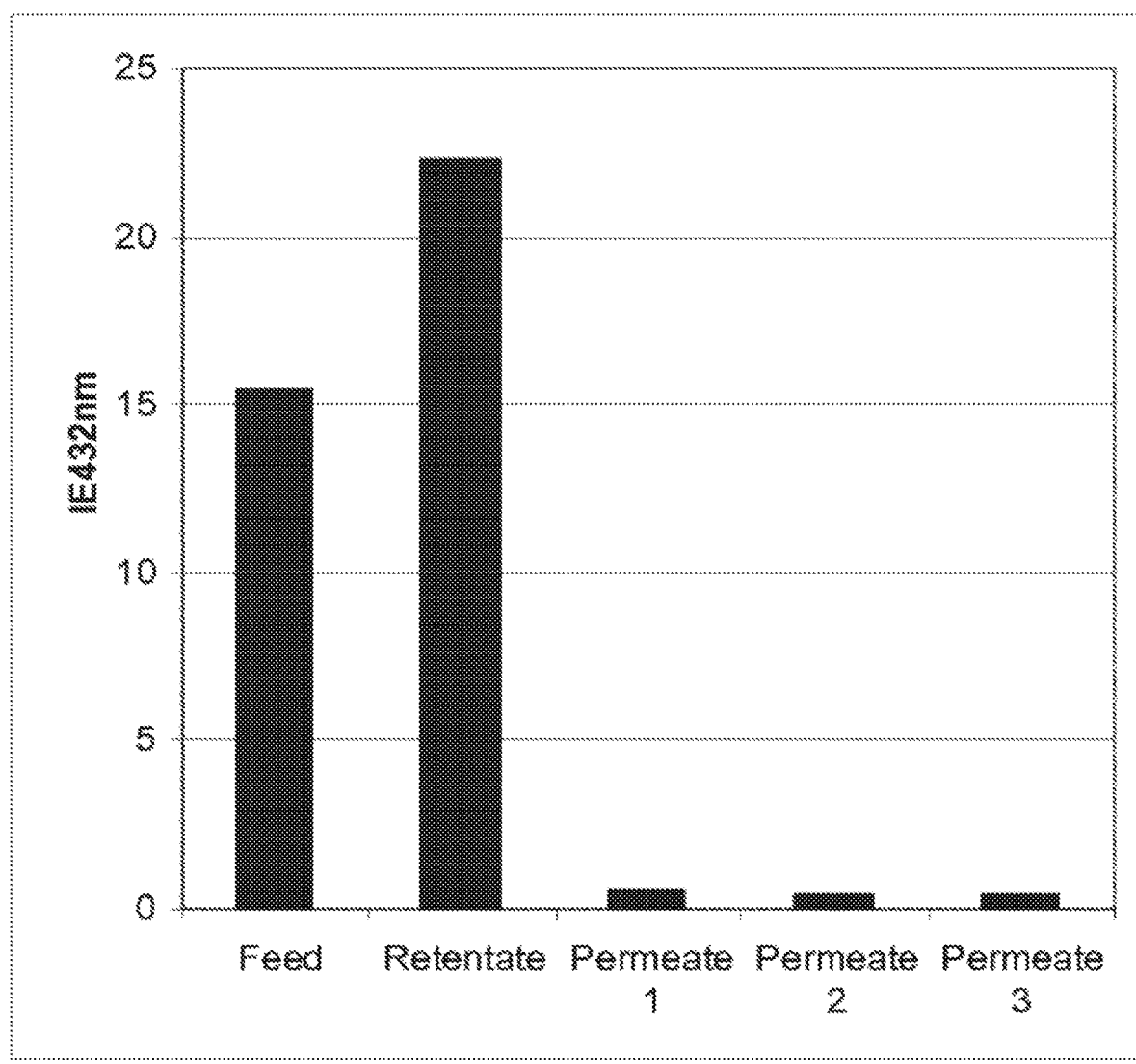
FIG. 2 shows UV absorbance results at 432 nm to measure the strength of colour of feed, permeate and retentate samples from filtration of single-fold orange oil with PuraMem™ S380 membrane.

The strength of colour of the orange oil samples was determined using a UV spectrophotometer to measure the absorbance at a wavelength of 432 nm. FIG. 2 shows the measured UV absorbance of the feed oil, the retained portion of the orange oil and the three permeate aliquots. The strength of colour in the permeate samples was reduced from approximately 16 absorbance units in the feed oil to approximately 1 absorbance unit in the permeate samples. Concomitantly the strength of colour in the retentate increased from approximately 16 absorbance units to 23 absorbance units, which is consistent with only a small proportion of the coloured compounds being transported through the membrane during the filtration. These results demonstrate the potential to reduce the colour of essential oils, including citrus oils, especially orange oil.

Example 2

Colour Removal from Five-Fold Orange Oil

A dead-end METcell filtration cell (Evonik Membrane Extraction Technology Ltd, UK) containing a coupon of PuraMemIlvi S380 organic solvent nanofiltration membrane (Evonik Membrane Extraction Technology Ltd., UK) was used for this experiment—see FIG. 1 for a schematic diagram of the METcell dead-end filtration system. PuraMem™ S380 is a silicone-coated membrane prepared according to DE10 2009 047 351 with a nominal molecular weight cut-off of 600 g.morl. The membrane was made ready for use by filtering 200 mL of limonene (Sigma-Aldrich, Germany) at ambient temperature and 30 bar filtration pressure to remove the conditioning agent (preservative) from the PuraMernTivi S380 membrane.

Once the membrane was ready, the filtration cell was emptied and refilled with 100 mL of five-fold orange oil. The five-fold orange oil was filtered at a temperature of 30 deg C. and filtration pressure of 30 bar. 65 mL of the oil was permeated; the first 25 mL permeate was collected as one aliquot "Permeate 1"; the next 20 mL of permeate was collected as a second aliquot ("Permeate 2"), and; the next 20 mL was collected as the third and final aliquot ("Permeate 3").

Figure 3:
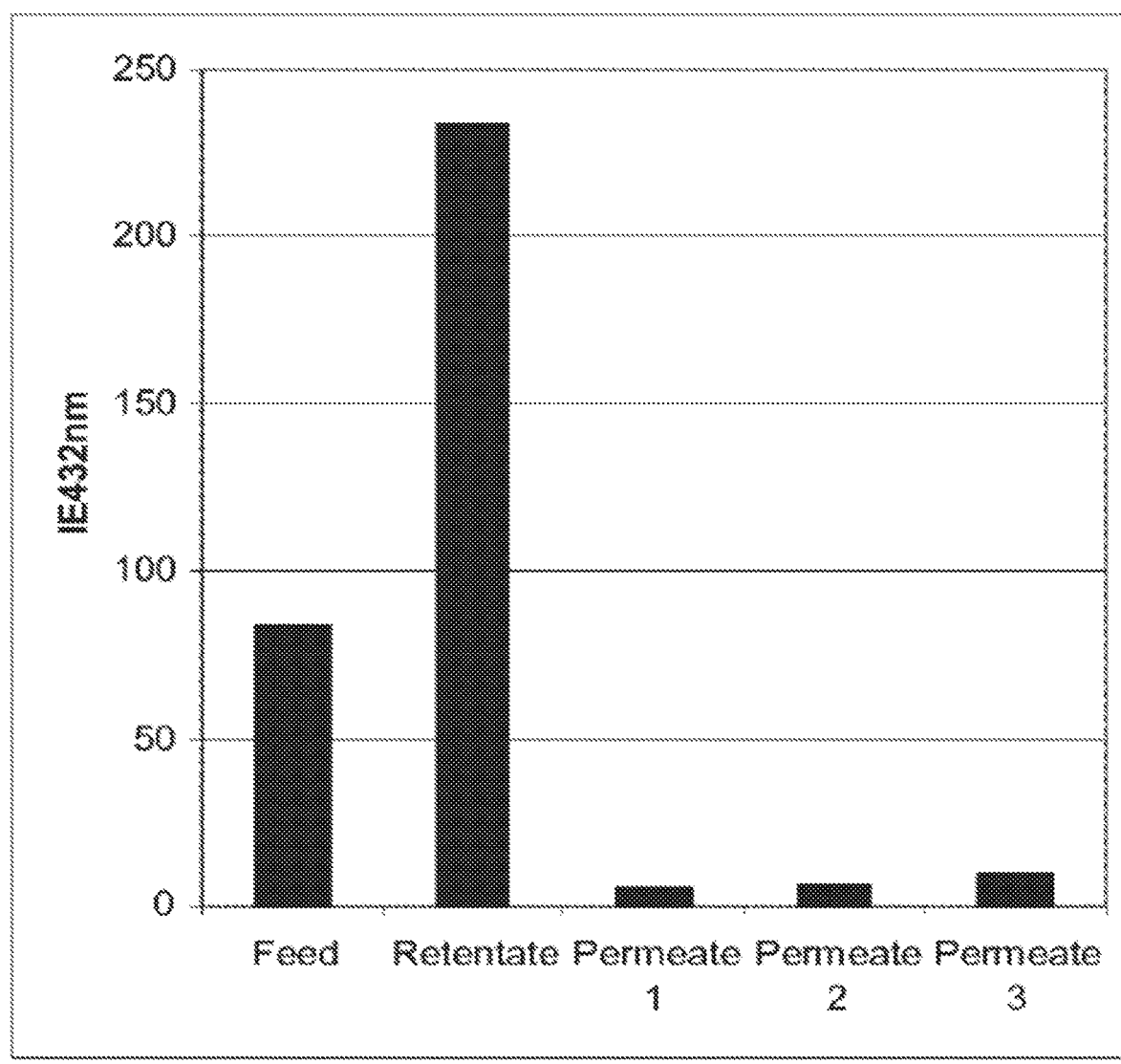
FIG. 3 shows UV absorbance values at 432 nm to measure the strength of colour of feed, permeate and retentate samples from filtration of five-fold orange oil with PuraMem™ S380 membrane.

The strength of colour of the orange oil samples was determined using a UV spectrophotometer to measure the absorbance at a wavelength of 432 nm. FIG. 3 shows the measured UV absorbance of the feed oil, the retained portion of the orange oil and the three permeate aliquots. The strength of colour in the permeate samples was reduced from approximately 85 absorbance units in the feed oil to 5-10 absorbance units in the permeate samples. Concomitantly the strength of colour in retentate increased from approximately 85 absorbance units to 230 absorbance units, which is consistent with only a small proportion of the coloured compounds being transported through the membrane during the filtration. These results demonstrate the potential to reduce the colour of concentrated (multi-fold) essential oils, including five-fold citrus oils, especially orange oil.

Example 3

Removal of Natural Impurity (wax) from Orange Oil

A dead-end METcell filtration cell (Evonik Membrane Extraction Technology Ltd, UK) containing a coupon of PuraMemmil S380 organic solvent nanofiltration membrane (Evonik Membrane Extraction Technology Ltd., UK) was used for this experiment—see FIG. 1 for a schematic diagram of the METcell dead-end filtration system. PuraMem™ S380 is a silicone-coated membrane prepared according to DE10 2009 047 351 with a nominal molecular weight cut-off of 600 g.mol-1. The membrane was made ready for use by filtering 200 mL of limonene (Sigma-Aldrich, Germany) at ambient temperature and 30 bar filtration pressure to remove the conditioning agent (preservative) from the PuraMemThil S380 membrane.

Once the membrane was prepared, the filtration cell was emptied and refilled with 100 mL of five-fold orange oil. The five-fold orange oil was filtered at a temperature of 30 deg C. and filtration pressure of 30 bar. 65 mL of the oil was permeated.

Figure 4:
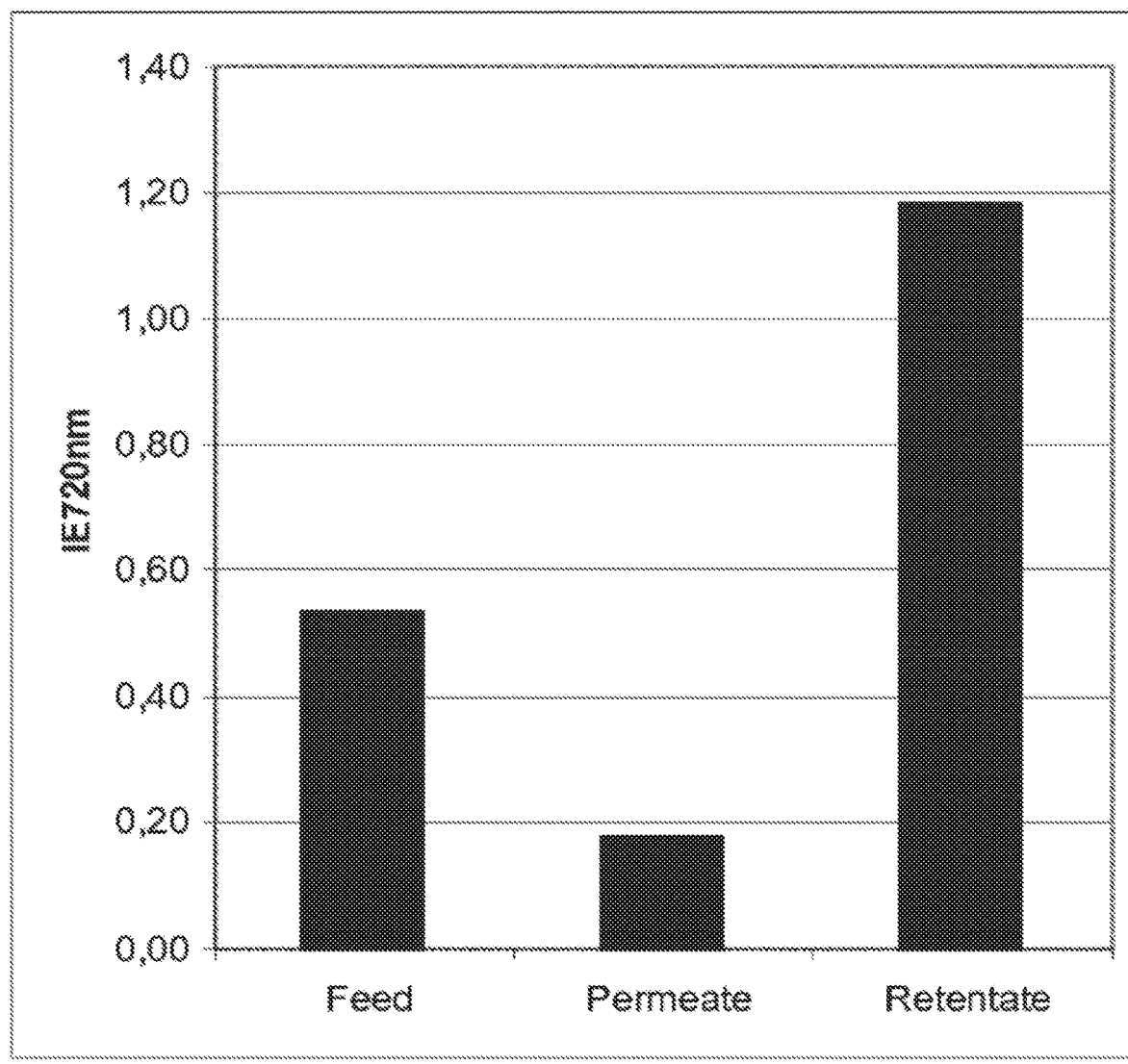
FIG. 4 UV shows absorbance values at 720 nm to measure the wax content of feed, permeate and retentate samples from filtration of five-fold orange oil with PuraMem™ S380 membrane.

The wax content of the orange oil samples was determined after the oil samples had been chilled for at least 24 hours at −24 deg C. by assessing turbidity of the solutions using a UV spectrophotometer to measure the absorbance at a wavelength of 720 nm. FIG. 4 shows the measured UV absorbance of the feed oil, the retained portion of the orange oil and the permeated orange oil. The wax content of the permeate samples was reduced from approximately 0.54 absorbance units in the feed oil to 0.18 absorbance units in the permeate samples. Concomitantly the wax content of the retentate increased from approximately 0.54 absorbance units to approximately 1.18 absorbance units, which is consistent with a large proportion of the wax compounds being retained by the membrane during the filtration. These results demonstrate the potential to reduce the wax content of essential oils, including five-fold citrus oils, especially five-fold orange oil. This example together with Example 2 also con firm, that simultaneously wax and the colouring impurity can be removed from the orange oil.

Example 4

Fractionation of Components in Single-Fold Orange Oil

Figure 5:
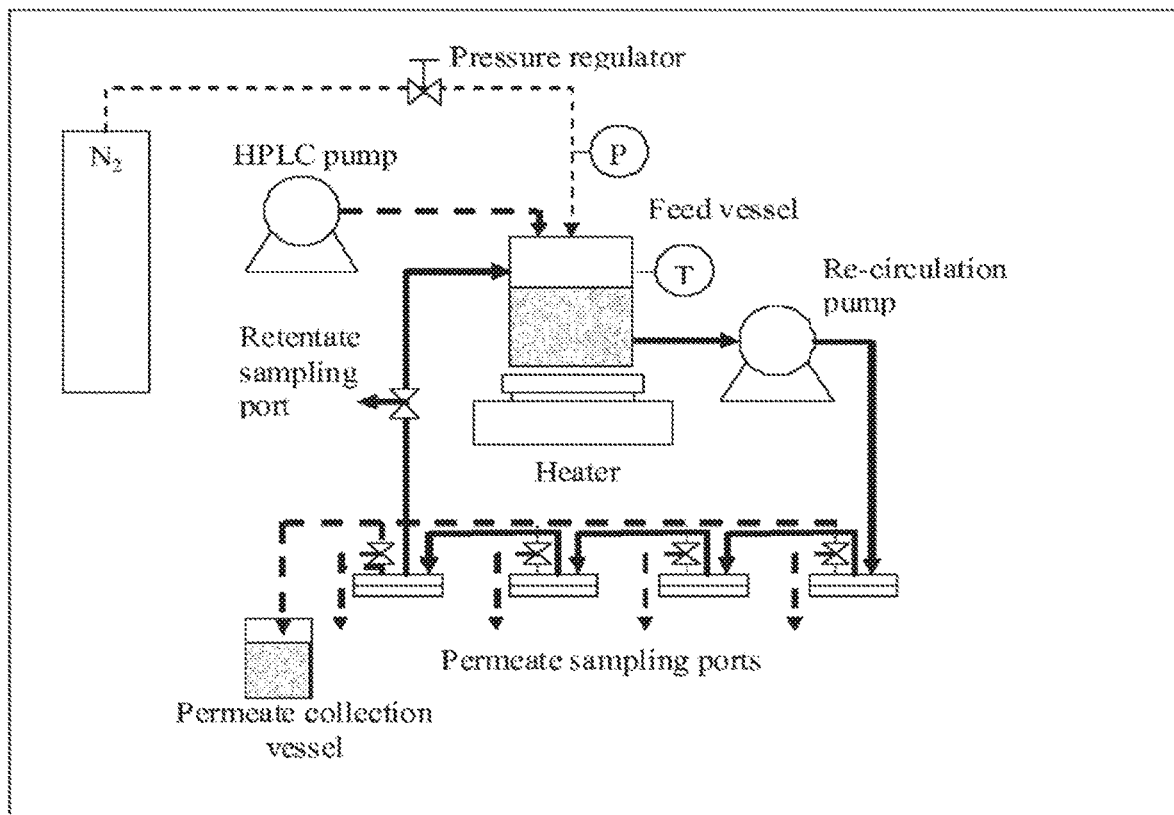
FIG. 5 is a schematic diagram of a METcell crossflow filtration system containing four crossflow filtration cells.

A METcell crossflow filtration system (Evonik Membrane Extraction Technology Ltd, UK) containing coupons of DuraMemllvi S XP2 organic solvent nanofiltration membrane (Evonik Membrane Extraction Technology Ltd.) was used for this experiment—see FIG. 5 for a schematic diagram of the METcell crossflow filtration system. DuraMem™ S XP2 is a silicone-coated membrane prepared according to DE10 2009 047 351 with a nominal molecular weight cut-off of approximately 350 g.mol-1. The membrane was made ready for use by filtering 200 mL of limonene (Sigma-Aldrich, Germany) through the membrane coupon at ambient temperature and 30 bar filtration pressure to remove the conditioning agent (preservative) from the DuraMemmA S XP2 membrane.

Once the membrane was ready, the filtration cell was emptied and refilled with 500 mL of single-fold orange oil that had been processed with a PuraMemmil S380 membrane according to the methodology of Example 3 to remove wax compounds. The single-fold orange oil was filtered at a temperature of 30 deg C. and filtration pressure of 30 bar. Samples of the permeate were collected and analysed using an Agilent 6850 gas chromatograph fitted with an FID detector. The gas chromatograph was fitted with an HP-5 column (30 m×0.25 mm diameter) from Agilent Technologies and subject to the following temperature programme—70 deg C. for 1 minute, ramp from 70 deg C. to 250 deg C. at 30 deg C. min-1, ramp from 250 deg C. to 310 deg C. at 20 deg C. min-1, hold 310 deg C. for 2 minutes. The injector temperature was 275 deg C. and the detector temperature was 350 deg C.

Table 1 shows the membrane rejection values for a select number of compounds in the oil calculated from the analytical results obtained from the gas chromatograph (rejection is defined above in Equation 1).

TABLE 1

Rejection of select compounds in single-fold orange oil when filtered with DuraMemTm S XP2 membrane

| Compound | Rejection (%) |
|---|---|
| Limonene | 0 |
| Decanal | 0 |
| Geranial | 0 |
| Valencene | 0 |
| a, 0-sinensal | 60 |
| Waxes, colour compounds, etc. | >95% |

Figure 6:
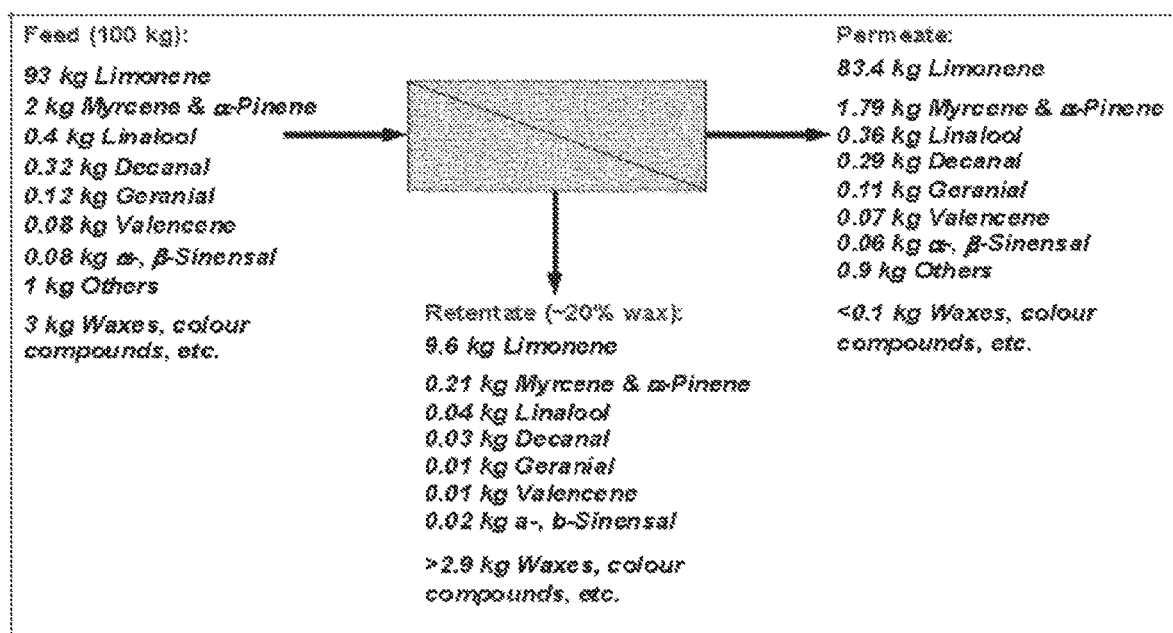
FIG. 6 shows an example mass balance of single-fold orange oil fractionation on the basis of 100 kg of orange oil in the feed.

The majority of the compounds present rejection values of 0%—this means that these species pass through the membrane unhindered and are present in the final permeate material in the same concentration as in the feed material. However, it can be seen that certain compounds, e.g. sinensal and waxes, present non-zero rejection values—this means that these species do not pass freely through the membrane and are concentrated in the retentate solution, leading to fractionation of these components from the orange oil. FIG. 6 shows an example of how these non-zero membrane rejection values provide fractionation of components of the essential oil between the retentate and permeate streams—the mass balance is calculated using the rejection data provided in Table 1. This example demonstrates the potential to fractionate components from essential oil, including single-fold orange oil.

Example 5—Removal of synthetic impurity (agrochemical residue) from orange oil membrane (Evonik Membrane Extraction Technology Ltd., UK) was used in a nanofiltration pilot plant. PuraMem™ S380 is a silicone-coated membrane prepared according to DE10 2009 047 351 with a nominal molecular weight cut-off of 600 g·mol-1. The membrane was prepared by filtering 5 L of limonene (Sigma-Aldrich, Germany) at ambient temperature and 30 bar filtration pressure to remove the conditioning agent (preservative) from the PuraMem™ S380 membrane. For the second stage of the experiment, a dead-end METcell filtration cell (Evonik Membrane Extraction Technology Ltd, UK) containing a coupon of DuraMem™ S XP2 organic solvent nanofiltration membrane (Evonik Membrane Extraction Technology Ltd.) was used for this experiment—see FIG. 1 for a schematic diagram of the METcell dead-end filtration system. DuraMem™ S XP2 is a silicone-coated membrane prepared according to DE10 2009 047 351 with a nominal molecular weight cut-off of approximately 350 g.moll. The membrane was prepared by filtering 200 mL of limonene (Sigma-Aldrich, Germany) through the membrane coupon at ambient temperature and 30 bar filtration pressure to remove the conditioning agent (preservative) from the DuraMemlM S XP2 membrane.

In the first stage of the experiment, 8.2 kg of five-fold orange oil was processed using the PuraMem™ S380 spiral-wound membrane module in the nanofiltration pilot plant. 5 kg of the oil was permeated at 30 bar and 30 deg C. The initial permeate mass flux was 23.5 kg.rn-2.h-1 and this reduced to 10.7 kg.rn-2.h-1 at the end of the experiment (after 5 kg had been permeated) reflecting the increased concentration of higher molecular weight compounds and increased viscosity in the retentate (e.g. waxes and colour compounds). Samples of the feed, retentate and permeate solutions were taken to determine the concentration of pesticides (agrochemical residues) present in the solutions. The samples were analysed for pesticide composition by AQura GmbH using an LC-MS-MS liquid chromatography method. The results for removal of select pesticides during filtration with PuraMemlM S380 are shown in Table 2.

TABLE 2

Concentration of select pesticides in feed, retentate and permeate solutions and rejection of pesticides when five fold orange oil is filtered with PuraMemTM S380 membrane

| Compound | Concentration in feed solution (mg/kg) | Concentration in retentate solution (mg/kg) | Concentration in permeate solution (mg/kg) | Rejection - PuraMem ™ S380 (%) |
|---|---|---|---|---|
| Azoxysstrobin | 0.034 | 0.039 | 0.025 | 36 |
| Difenoconazol | 0.0060 | 0.0080 | ND* | >95 |
| Flufenoxuron | 0.041 | 0.077 | 0.019 | 75 |
| Phosmet | 0.12 | 0.67 | 0.011 | 98 |
| Propargite | 0.57 | 0.69 | 0.76 | −10 |
| Spirodiclofen | 0.018 | 0.022 | 0.021 | 5 |

*ND—Not detected, below detection limit.

The data shows that with the PuraMem™ S380 membrane a range of separation performance is achieved—for instance both difenoconazol and phosmet are almost completely removed from the oil with this membrane, whereas propargite and spirodiclofen pass through the membrane almost unhindered. The permeate solution from this first experimental stage was further treated with a lower molecular weight cut-off membrane (DuraMem™ S XP2, nominal molecular weight cut-off approximately 350 g.mol-1) to ascertain if further reductions in agrochemical residue (pesticides) could be achieved.

In the second stage of the experiment, three samples containing 100 g of permeate produced by processing five-fold orange oil with the PuraMemmA S380 spiral-wound membrane module in the nanofiltration pilot plant were further processed using the DuraMemmil S XP2 membrane. 10 g of the oil from each sample was permeated at 38 bar and 30 deg C. The permeate mass flux was constant for all the filtrations at approximately 1.7 kg.rn Samples of the feed and permeate solutions were taken to determine the concentration of pesticides (agrochemical residues) present in the solutions—the assumption was made that the feed and retentate concentrations were the same, given the small volume of sample that was permeated. The samples were analysed for pesticide composition by AQura GmbH using an LC-MS-MS liquid chromatography method. The results for removal of select pesticides during filtration with DuraMemmil S XP2 are shown in Table 3

TABLE 3

Concentration of select pesticides in feed and permeate solutions and rejection of pesticides when five-fold orange oil previously filtered with PuraMemmil S380 membrane is filtered with DuraMemTm S XP2 membrane

| Compound | Concentration in feed solution (mg/kg) | Concentration in permeate solution (mg/kg) | Rejection - DuraMem ™ S XP2 (%) |
|---|---|---|---|
| Etoxazol | 0.024 | 0.008 | 67 |
| Flufenoxuron | 0.019 | ND* | >95 |
| Propargite | 0.76 | 0.18 | 76 |
| Spirodiclofen | 0.021 | ND | >95 |

*ND—Not detected, below detection limit.

The data shows that by applying the lower molecular weight cut-off membrane DuraMemmtIS XP2 additional removal of pesticides (agrochemical residues) can be achieved. This example demonstrates the potential to remove agrochemical residues from essential oil, including five-fold orange oil. Furthermore, this example demonstrates the potential benefits of processes sequentially applying more than one selectively permeable membrane to address a given separation task.

The invention claimed is:

1. A process for separating components in an essential oil, comprising:
    providing an essential oil or a solution comprising an essential oil and at least one organic solvent as a nanofiltration feed, wherein
        the essential oil is obtained from a natural raw material of plant origin by a process chosen from:
        a) steam distillation followed by separation of the aqueous phase, if any, by physical processes,
        b) mechanical processes from the epicarp of Citrus fruits followed by separation of the aqueous phase, if any, by physical processes,
        c) dry distillation followed by separation of the aqueous phase, if any, by physical processes,
        d) mechanical expression from a natural raw material of plant origin other than Citrus fruits,
        e) extraction of the natural raw material of plant origin with a supercritical solvent, and
        f) extraction of the natural raw material of plant origin with a non polar solvent with a dielectric constant, measured as the ratio of the electrical capacity of a capacitor filled with the solvent to the electrical capacity of the evacuated capacitor at room temperature, of less than or equal to 15;
    (ii) providing a selectively permeable nanofiltration membrane having a first surface and a second surface opposite to said first surface and having a molecular weight cut-off ranging from about 150 g/mol to about 1,500 g/mol;
    (iii) contacting the nanofiltration feed with the first surface of the selectively permeable nanofiltration membrane to separate components in the nanofiltration feed by allowing one or more components of the nanofiltration feed to transfer from the first surface to the second surface across the membrane,
        wherein the essential oil or solution comprising an essential oil and at least one organic solvent in contact with the first surface after transfer of the one or more components of the nanofiltration feed forms a retentate and the one or more components of the essential oil or the solution comprising an essential oil and at least one organic solvent contacting the second surface forms a permeate,
        wherein pressure at the first surface is greater than pressure at the second surface,
        and wherein a concentration of the one or more components of the essential oil or of the solution comprising an essential oil and at least one organic solvent is reduced in the retentate compared to the nanofiltration feed.

2. The process of claim 1, further comprising recovering any solvent content from the permeate and the retentate.

3. The process of claim 2, further comprising recovering any solvent content from the permeate and the retentate.

4. The process of claim 1, further comprising contacting the retentate and/or the permeate with at least one additional nanofiltration membrane.

5. The process of claim 1, wherein the essential oil derives from plants and is selected from oils produced from berries, seeds, bark, wood, rhiozome, leaves, resin, flowers, peel and root,
    essential oil from the genus Citrus, oils deriving from sweet orange, orange, lemon, lime, grapefruit, bergamot, key lime, pomelo, citron, mandarin, tangerine, bitter orange, rangpur, Persian lime, Clementine, yuzu, kaffir lime, or ugli, and allspice oil, juniper oil, cumin oil, cinnamon bark oil, camphor oil, rosewood oil, ginger oil, basil oil, eucalyptus oil, lemongrass oil, peppermint oil, rosemary oil, spearmint oil, tea tree oil, frankincense oil, chamomile oil, clove oil, jasmine oil, lavender oil, rose oil, ylang ylang oil, bergamot oil, grapefruit oil, lemon oil, lime oil, orange oil, and valerian oil.

6. The process of claim 5, wherein contacting the nanofiltration feed and contacting the retentate and/or the permeate are carried out with two different nanofiltration membranes, one nanofiltration membrane having a molecular weight cut-off between 400 g/mol and 1,500 g/mol and the other nanofiltration membrane having a different molecular weight cut-off between 150 g/mol and 600 g/mol.

7. The process of claim 1, wherein the retentate has a reduction in at least one chosen from
wax content,
colour, and
a natural and/or synthetic impurity chosen from environmental pollutants, agrochemical residues, extractables from packaging, waxes, plant sterols, lipophilic hormones, colored components, oxidation products, components that create unwanted smell and/or taste in the oil mixture, and vitamins, as compared to the nanofiltration feed.

8. The process of claim 7, wherein the natural and/or synthetic impurity is an agrochemical residue.

9. The process of claim 1, wherein the retentate comprises an increased concentration of at least one component chosen from vitamins, plant sterols, lipophilic hormones, colored components, furanocoumarins, and sesquiterpines, relative to the nanofiltration feed.

10. The process of claim 1, wherein the organic solvent is chosen from
aromatic hydrocarbons, aliphatic hydrocarbons, ketones, glycols, chlorinated solvents, esters, ethers, amines, nitriles, aldehydes, phenols, amides, carboxylic acids, alcohols, furans, lactones, dipolar aprotic solvents, toluene, xylene, benzene, styrene, anisole, chlorobenzene, dichlorobenzene, chloroform, dichloromethane, dichloroethane, methyl acetate, ethyl acetate, isopropyl acetate, butyl acetate, methyl ether ketone (MEK), methyl isobutyl ketone (MIRK), acetone, ethylene glycols, ethanol, methanol, isopropanol, propanol, butanol, hexane, heptane, cyclohexane, dimethoxyethane, methyl tert butyl ether (MTBE), diethyl ether, adiponitrile, N,N-dimethylformamide, dimethylsulfoxide, N,N-dimethylacetamide, dioxane, nitromethane, nitrobenzene, pyridine, carbon disulfide, tetrahydrofuran, methyl-tetrahydrofuran, N-methyl pyrrolidone, N-ethyl pyrrolidone, acetonitrile, and mixtures thereof.

11. The process of claim 1, wherein the selectively permeable nanofiltration membrane comprises a material chosen from polyethylene, polypropylene, polytetrafluoroethylene (PTFE), polyvinylidene difluoride (PVDF), polysulfone, polyethersulfone, polyacrylonitrile, polyamide, polyimide, polyamideimide, polyetherimide, cellulose acetate, polyaniline, polypyrrole, polyetheretherketone (PEEK), polybenzimidazole, and mixtures thereof.

12. The process of claim 11, wherein the selectively permeable nanofiltration membrane comprises a polyimide.

13. The process of claim 1, wherein the selectively permeable nanofiltration membrane is a composite material comprising a support and a selectively permeable layer, wherein the selectively permeable layer comprises a material chosen from-polydimethylsiloxane (PDMS) based elastomers, ethylene-propylene diene (EPDM) based elastomers, polynorborene based elastomers, polyoctenamer based elastomers, polyurethane based elastomers, butadiene and nitrile butadiene rubber based elastomers, natural rubber, butyl rubber based elastomers, polychloroprene (Neoprene) based elastomers, epichlorohydrin elastomers, polyacrylate elastomers, polyethylene, polypropylene, polytetrafluoroethylene (PTFE), polyvinylidene difluoride (PVDF) based elastomers, polyetherblock amides (PEBAX), polyurethane elastomers, crosslinked polyether, polyamide, polyaniline, polypyrrole, and mixtures thereof.

14. The process of claim 1, wherein the selectively permeable nanofiltration membrane comprises an inorganic material chosen from silicon carbide, silicon oxide, zirconium oxide, titanium oxide, and zeolites.

15. The process of claim 1, wherein the selectively permeable nanofiltration membrane comprises a polymer membrane with dispersed organic or inorganic matrices in the form of powdered solids present in amounts up to about 20 wt % of the polymer membrane.

16. The process of claim 1, wherein the selectively permeable nanofiltration membrane comprises a silicone-coated organic solvent nanofiltration membrane.

17. The process of claim 1, wherein the selectively permeable nanofiltration membrane has a molecular weight cut-off ranging from about 200 g/mol to about 800 g/mol.

18. The process of claim 17, wherein the selectively permeable nanofiltration membrane is a silicone-coated polyimide nanofiltration membrane.

19. The process of claim 1, wherein the process is performed at a temperature ranging from about 10° C. to about 50° C. and/or with a transmembrane pressure ranging from about 10 bar to 60 bar and/or wherein the essential oil is dissolved in organic solvent at a concentration ranging from about 1% v/v to about 95% v/v.

* * * * *